(12) United States Patent
Ono et al.

(10) Patent No.: US 12,202,054 B2
(45) Date of Patent: Jan. 21, 2025

(54) TOOL DRIVING DEVICE AND METHOD OF PRODUCING DRILLED PRODUCT

(71) Applicant: SUBARU CORPORATION, Tokyo (JP)

(72) Inventors: Ryohei Ono, Tokyo (JP); Masao Watanabe, Tokyo (JP); Tatsuo Nakahata, Tokyo (JP); Shinya Matsuo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/364,573

(22) Filed: Aug. 3, 2023

(65) Prior Publication Data

US 2024/0066675 A1 Feb. 29, 2024

(30) Foreign Application Priority Data

Aug. 23, 2022 (JP) ................... 2022-132188

(51) Int. Cl.
*B23B 47/26* (2006.01)
*B23B 31/107* (2006.01)
*B23B 45/00* (2006.01)

(52) U.S. Cl.
CPC ............ *B23B 31/107* (2013.01); *B23B 45/00* (2013.01); *B23B 47/26* (2013.01)

(58) Field of Classification Search
CPC ..... B23B 45/003; B23B 45/008; B23B 47/34; B23B 47/26; B23B 51/12; B25D 17/005; B25D 11/005; B25D 11/10; B25D 11/102; B25D 11/104; B25D 16/00; B25D 16/003; B25D 2250/195; B25D 2250/201;
(Continued)

(56) References Cited

U.S. PATENT DOCUMENTS 2,742,265 A 4/1956 Snyder
2,770,974 A 11/1956 Jacobs
2,923,191 A 2/1960 Fulop
(Continued)

FOREIGN PATENT DOCUMENTS

DE 198 21 554 A1 11/1999
EP 0 489 359 A1 6/1992
(Continued)

OTHER PUBLICATIONS

Non Final Office Action mailed Oct. 27, 2023 in U.S. Appl. No. 17/673,040 (7 pages).
(Continued)

*Primary Examiner* — Nicole N Ramos
(74) *Attorney, Agent, or Firm* — Smith, Gambrell & Russell, LLP

(57) ABSTRACT

According to one implementation, a tool driving device includes a drill chuck, a motor, a casing and a vibrating mechanism. The drill chuck holds a drill. The motor is configured to rotate the drill chuck. The casing houses the motor. The vibrating mechanism is configured to periodically reciprocate the drill chuck relatively to the casing in a tool axis direction during rotation of the drill chuck. The vibrating mechanism is configured to distance the drill chuck from the casing at a first speed smaller than a second speed for bringing the drill chuck close to the casing.

11 Claims, 8 Drawing Sheets

(58) Field of Classification Search
CPC ........ B25D 2250/205; B25D 2250/321; B28D 1/26; B25B 21/026; B25B 21/023; B25B 21/02

See application file for complete search history.

(56) References Cited

U.S. PATENT DOCUMENTS

| | | | |
|---|---|---|---|
| 2,940,565 | A | 6/1960 | Schodeberg |
| 3,106,274 | A | 10/1963 | Madsen |
| 3,133,601 | A | 5/1964 | Fulop |
| 3,149,681 | A | 9/1964 | Drew |
| 3,235,014 | A | 2/1966 | Brooks |
| 3,256,946 | A | 6/1966 | Jansen et al. |
| 5,992,538 | A | 11/1999 | Marcengill et al. |
| 6,138,772 | A | 10/2000 | Miescher et al. |
| 6,213,222 | B1 | 4/2001 | Banach |
| 8,517,093 | B1* | 8/2013 | Benson .................... E21B 47/09 166/177.2 |
| 9,982,532 | B2* | 5/2018 | Benson .................... E21B 47/00 |
| 10,315,299 | B2* | 6/2019 | Herr ........................ B25D 17/06 |
| 10,738,553 | B2 | 8/2020 | Wiercigroch et al. |
| 2005/0212223 | A1* | 9/2005 | Tian ..................... B23B 31/1238 279/62 |
| 2007/0181321 | A1 | 8/2007 | Ha et al. |
| 2009/0110496 | A1 | 4/2009 | Veres |
| 2010/0252290 | A1 | 10/2010 | Grand |
| 2018/0080284 | A1* | 3/2018 | Prill ........................ E21B 4/003 |
| 2022/0288700 | A1 | 9/2022 | Ono et al. |

FOREIGN PATENT DOCUMENTS

| | | |
|---|---|---|
| EP | 2 052 809 A1 | 4/2009 |
| EP | 3 753 676 A1 | 12/2020 |
| EP | 4 056 322 A1 | 9/2022 |
| FR | 1 423 047 A | 1/1966 |
| GB | 877794 | 9/1961 |
| GB | 1 346 537 A | 2/1974 |
| JP | S54-054992 U | 4/1979 |
| JP | S56-107812 A | 8/1981 |
| JP | H06-98579 B2 | 12/1994 |
| JP | H10-505 A | 1/1998 |
| JP | H11-33825 A | 2/1999 |
| JP | 2003-117852 A | 4/2003 |
| JP | 2003-266426 A | 9/2003 |
| JP | 2019-214079 A | 12/2019 |
| WO | 2019/158114 A1 | 8/2019 |

OTHER PUBLICATIONS

Final Office Action mailed Mar. 19, 2024 in U.S. Appl. No. 17/673,040 (14 pages).
Extended European Search Report dated Jan. 23, 2024 for European Patent Application No. 23189950.1 (10 pages).
Extended European Search Report dated Jul. 29, 2022 for European Patent Application No. 22154953.8 (8 pages).
Notice of Allowance and Fees Due mailed May 30, 2024 for U.S. Appl. No. 17/673,040 (7 pages).
Japanese Office Action mailed Jun. 14, 2024 for Japanese Patent Application No. 2021-039744 (3 pages in Japanese; 4 pages English translation). [Japanese patent family member to U.S. Appl. No. 17/673,040].

* cited by examiner

A-A

A-A

B-B

TOOL DRIVING DEVICE AND METHOD OF PRODUCING DRILLED PRODUCT

CROSS REFERENCES TO RELATED APPLICATIONS

This application is based upon and claims the benefit of priority from Japanese Patent Application No. 2022-132188, filed on Aug. 23, 2022; the entire contents of which are incorporated herein by reference.

FIELD

Implementations described herein relate generally to a tool driving device and a method of producing a drilled product.

BACKGROUND

It is important for drilling to finely cut and discharge chips so that grooves of a drill may not be clogged with the chips. For that reason, a mechanism for cutting chips finely by intentionally vibrating a drill in a tool axis direction has been suggested conventionally (for example, refer to Japanese Patent Application Publication JP 2003-117852A, Japanese Patent Application Publication JP 2003-266426A and Japanese Patent Application Publication JP H10-000505A).

Specifically, a spindle can be vibrated in the rotation axis direction by putting balls, held by a retainer, in and out from concave portions rotated together with the spindle. More specifically, a drill moves together with the spindle in a direction away from an object to be drilled (workpiece) when the balls are put in the concave portions respectively while the drill moves together with the spindle in a direction toward the workpiece when the balls are put out from the concave portions respectively. Thereby, the spindle and the drill can be periodically reciprocated in the tool axis direction with constant amplitude.

As other examples of a mechanism for vibrating a drill, a mechanism which vibrates a spindle by sliding a cam fixed to the spindle, and a mechanism in which vibration is generated by ultrasonic waves are also suggested (for example, refer to Japanese Patent Publication JP H06-098579B2 and Japanese Patent Application Publication JP 2019-214079A).

However, when the conventional vibrating mechanism which vibrates a drill by rolling balls is used, the drill separates from a workpiece for a moment at the timing of entry of each ball into a concave portion, and subsequently the drill is suddenly pushed out toward the workpiece at the timing of exit of each ball from the concave portion. For this reason, when a user performs drilling using a handheld tool driving device, the tool driving device possibly held with loosen force may be pushed back due to drilling reaction. Consequently, drilling cannot be restarted promptly after the balls are put out from the concave portions respectively.

Conversely, when a user holds a handheld tool driving device with force, a drill collides with a workpiece at the timing of exit of each ball from the concave portion. Therefore, when the workpiece has large strength compared to that of the drill, the drill may be damaged. As a concrete example, when titanium is drilled with adopting the conventional vibrating mechanism, a drill may be damaged since titanium has strength larger than that of typical material of the drill.

Therefore, when hard-to-cut material, such as titanium, may be drilled, the conventional vibrating mechanism cannot be adopted. As a result, when metal, such as aluminum, as well as hard-to-cut material, such as titanium, is drilled by a tool driving device having no vibrating mechanism, a discharged continuous chip of the metal cannot be divided, and thereby may clog a groove of the drill. When a groove of the drill is clogged with a chip, a problem that rotation of the drill stops or a workpiece is damaged may arise.

In particular, in a case where laminated material of metal and FRP (Fiber Reinforced Plastic), such as GFRP (Glass Fiber Reinforced Plastic) or CFRP (Carbon Fiber Reinforced Plastic), which is also called composite material, is drilled from the FRP side, a problem that a drill is clogged with a metal chip, and thereby it becomes difficult to continue drilling, or a problem that the hole size of the FRP becomes excessive as a result that the inner surface of the FRP is cut by the drill clogged with a metal chip may arise when the drilling of the metal starts after the drilling of the FRP has been completed.

On the other hand, adopting a mechanism which vibrates a spindle by sliding a cam having recesses and projections causes a problem that the vibration becomes unstable and an exchange frequency of a part increases, compared with a mechanism which vibrates a spindle by rolling balls, due to remarkable wear of the cam. Accordingly, in order to vibrate a drill stably for a long period of time, it is realistic to adopt a mechanism which vibrates a spindle by rolling rotating bodies, such as balls, whose friction and wear are small.

Accordingly, an object of the present invention is to make it possible to drill a workpiece stably by preventing chip clogging in a drill and breakage of the drill.

SUMMARY

In general, according to one implementation, a tool driving device includes a drill chuck, a motor, a casing and a vibrating mechanism. The drill chuck holds a drill. The motor is configured to rotate the drill chuck. The casing houses the motor. The vibrating mechanism is configured to periodically reciprocate the drill chuck relatively to the casing in a tool axis direction during rotation of the drill chuck. The vibrating mechanism is configured to distance the drill chuck from the casing at a first speed smaller than a second speed for bringing the drill chuck close to the casing.

Further, according to one implementation, a method of producing a drilled product includes: holding the drill by the above-mentioned tool driving device; and producing the drilled product by drilling an object by the drill rotated by the tool driving device.

DETAILED DESCRIPTION

A tool driving device and a method of producing a drilled product according to implementations of the present invention will be described with reference to accompanying drawings.
(First Implementation)
(Structure and Function)

Figure 1:
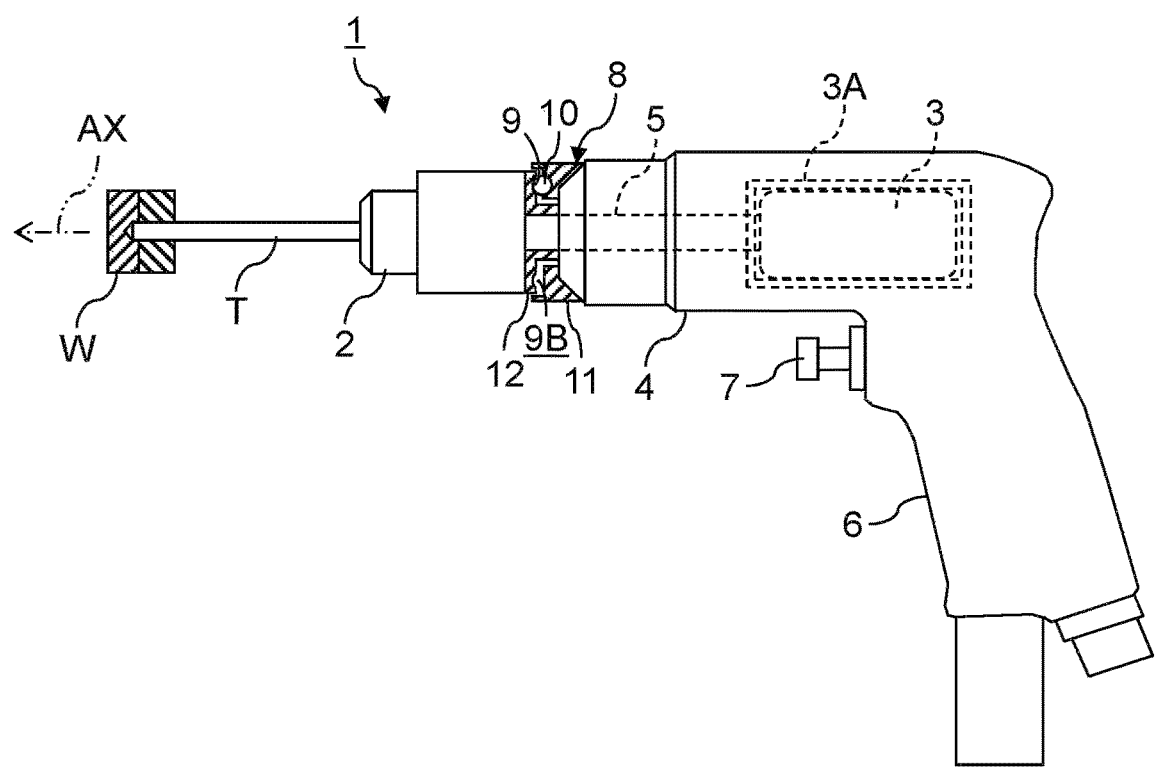
FIG. 1 is a partial sectional view showing structure of a tool driving device according to the first implementation of the present invention.

FIG. 1 is a partial sectional view showing structure of a tool driving device according to the first implementation of the present invention.

A tool driving device 1 is a device for holding and rotating a drill T in order to drill a workpiece W to be drilled. Note that, there is a case where a boring tool held by the tool driving device 1 is called a drill bit while the tool driving device 1 itself for rotating a drill bit is called a drill.

The tool driving device 1 may include not only a rotating mechanism of the drill T, but a feeding mechanism of the drill T. That is, the drill T may be fed out towards the workpiece W by pushing out the tool driving device 1 itself by a user. Alternatively, the drill T may be fed out towards the workpiece W automatically or semiautomatically by a tool feeding mechanism.

The tool driving device 1 can be composed of a drill chuck 2 for holding the drill T, a motor 3 for rotating the drill chuck 2, and a casing 4 for housing the motor 3. The motor 3 may be any of an electric type, a hydraulic type, a pneumatic type, and another type. The output shaft of the motor 3 can be operated as a spindle 5 which rotates the drill chuck 2 together with the drill T. In other words, the output shaft of the motor 3 may be integrated with the spindle 5. As a matter of course, the output shaft of the motor 3 and the spindle 5 may be disposed in parallel or on a same straight line, and torque may be transmitted by gears or the like.

When the tool driving device 1 is handheld, a grip 6 for being grasped by a user is formed in the casing 4. A switch 7 for operating the motor 3 may be attached to the grip 6 or the vicinity of the grip 6.

In addition, the tool driving device 1 include a vibrating mechanism 8 which periodically reciprocates the drill T, the drill chuck 2, and the spindle 5 relatively to the casing 4 in a tool axis AX direction during rotation of the drill T, the drill chuck 2, and the spindle 5. When the spindle 5 is reciprocated in the tool axis AX direction, the motor 3 is also reciprocated in the tool axis AX direction as long as the motor 3 is typical. Accordingly, a clearance may be made between the motor 3 and a motor casing 3A for housing the motor 3, for example, so that the motor 3 can be reciprocated in the tool axis AX direction although the motor casing 3A originally houses the motor 3 without any clearance.

When the drill T and the drill chuck 2 are periodically reciprocated in the tool axis AX direction by the vibrating mechanism 8 by a distance of 0.01 mm to 0.15 mm which is slight compared to a feeding amount, a discharged continuous chip like a metal chip can be divided. In other words, when the drill T and the drill chuck 2 are vibrated with amplitude of 0.01 mm to 0.15 mm, a chip can be divided. As a result, the drill T can be prevented from being clogged with a chip.

This is because moving the drill T and the drill chuck 2 in the direction toward the casing 4 results in separation of the drill T from the workpiece W once during cutting, and thereby drilling is interrupted. After that, the cutting can be restarted by feeding the drill T and the drill chuck 2. Such processing that drilling is intermittently performed while discharging chips by repeating cutting and intermission alternately is also called peck processing, peck drilling or step drilling.

Note that, too small amplitude of the vibration, which is concretely amplitude of less than 0.01 mm, results in insufficiency in the dividing effect of a chip while too large amplitude of the vibration, which is concretely amplitude of more than 0.15 mm, makes it difficult for a user to hold the tool driving device 1 by hand.

In particular, the vibrating mechanism 8 is configured to distance the drill T and the drill chuck 2 from the casing 4 at a speed smaller than that for bringing the drill T and the drill chuck 2 close to the casing 4. That is, the drill T vibrates at different speeds between the forward path and the return path. More specifically, the drill T and the drill chuck 2 are instantaneously moved in the direction toward the casing 4 in order to interrupt drilling once by distancing the drill T during cutting, from the workpiece W while the drill T and the drill chuck 2 are moved as slowly as possible in the direction away from the casing 4 in order to bring the drill T and the drill chuck 2, distanced from the workpiece W once, close to the workpiece W again.

Accordingly, the drill T is instantaneously pulled apart from the workpiece W, and thereby a chip can be divided certainly by intermission of drilling. Meanwhile, the drill T is moved toward the workpiece W at a low speed at the time of restarting the drilling, and therefore trouble that the drill T collides to the workpiece W, and thereby the drill T is damaged can be prevented. In addition, since the drill T is moved toward the workpiece W at a low speed just after restarting the drilling, the increasing rate of the drilling reaction can be reduced, and thereby trouble that a user is pushed back due to precipitous increase in drilling reaction can be avoided.

The vibrating mechanism 8 can consist of a sliding surface 9 and balls 10. The sliding surface 9 has recesses and projections corresponding to the moving speed of the drill T and the drill chuck 2. The balls 10 roll on the sliding surface 9 during rotation of the drill chuck 2. Note that, the vibrating mechanism 8, i.e., the vibrator can also consist of the sliding surface 9 and rolling objects, such as rollers each having a rotation shaft, skids, or disk members each having smooth convexity to which lubricity is given, sliding on the recesses and projections of the sliding surface 9, instead of the balls 10. Henceforth, the most practical case where the balls 10 are used will be described as an example.

Figure 2:
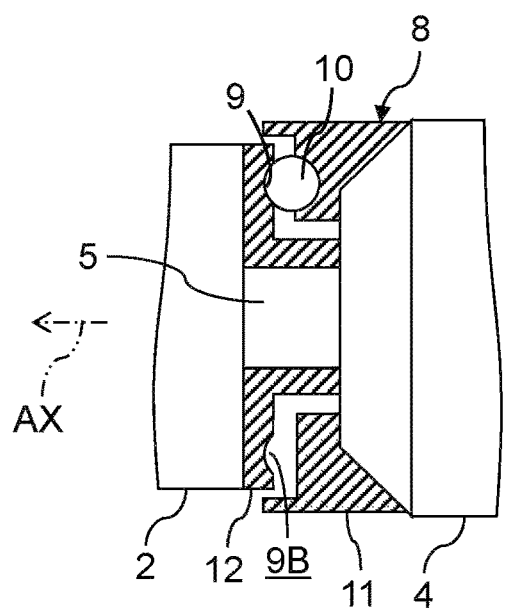
FIG. 2 is an enlarged partial longitudinal sectional view of the vibrating mechanism shown in FIG. 1.
Figure 3:
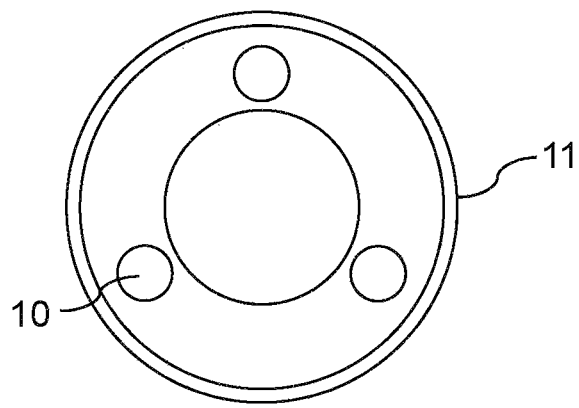
FIG. 3 is a left side view of a static ring included in the vibrating mechanism shown in FIG. 2 in a state where the balls have been placed on the static ring.
Figure 4:
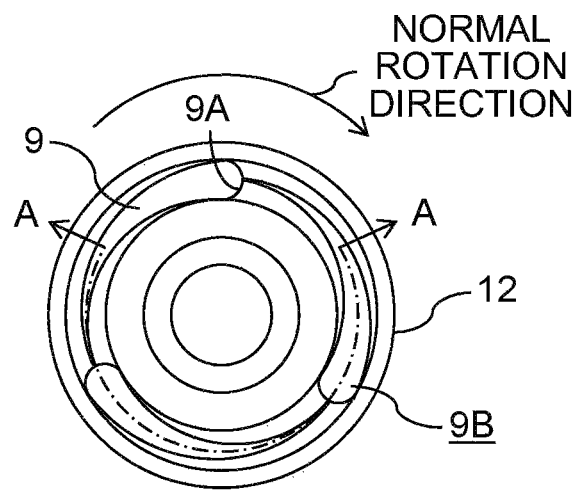
FIG. 4 is a right side view of a rotary ring included in the vibrating mechanism shown in FIG. 2.
Figure 5:
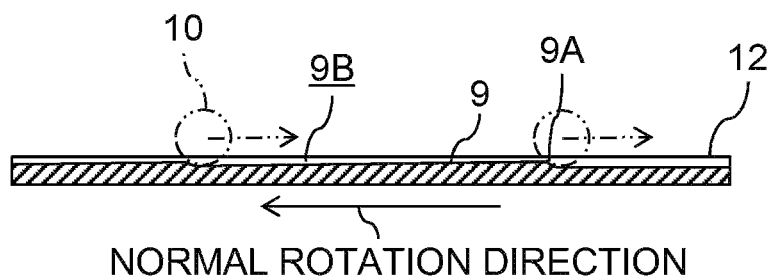
FIG. 5 shows the cross section, developed on a plane, of the rotary ring at the position A-A shown in FIG. 4.
Figure 6:
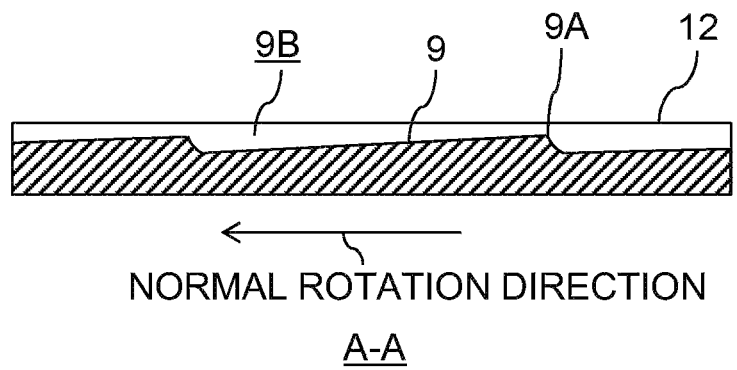
FIG. 6 shows the recesses and projections of the rotary ring emphasized by enlarging the developed cross sectional view of the rotary ring shown in FIG. 5 only in the thickness direction of the rotary ring.

FIG. 2 is an enlarged partial longitudinal sectional view of the vibrating mechanism 8 shown in FIG. 1. FIG. 3 is a left side view of a static ring 11 included in the vibrating mechanism 8 shown in FIG. 2 in a state where the balls 10 have been placed on the static ring 11. FIG. 4 is a right side view of a rotary ring 12 included in the vibrating mechanism 8 shown in FIG. 2. FIG. 5 shows the cross section, developed on a plane, of the rotary ring 12 at the position A-A shown in FIG. 4. FIG. 6 shows the recesses and projections of the rotary ring 12 emphasized by enlarging the developed cross sectional view of the rotary ring 12 shown in FIG. 5 only in the thickness direction of the rotary ring 12.

The balls 10 are equally spaced on a same circle between the drill chuck 2 and the casing 4 so that the respective balls 10 can roll. The sliding surface 9 to which the balls 10 contact while rolling during rotation of the drill chuck 2 can be formed directly or indirectly in either the drill chuck 2 or the casing 4.

For that purpose, in the illustrated example, the static ring 11 and the rotary ring 12 are fixed to the casing 4 and the drill chuck 2 respectively with a space so that the static ring 11 and the rotary ring 12 may not contact with each other. The static ring 11 has a through hole for passing through the spindle 5 at the center portion. The rotary ring 12 also has a through hole for passing through the spindle 5 at the center portion. Note that, the rotary ring 12 may be fixed to the spindle 5 by forming a female screw on the inner surface of the through hole of the rotary ring 12 while forming a male screw on the surface of the spindle 5. Therefore, the rotary ring 12 rotates together with the drill chuck 2 and the spindle 5 relatively to the casing 4 and the static ring 11 although the static ring 11 does not rotate relatively to the casing 4.

The balls 10 are partially housed in spherical concaves, formed on the static ring 11 at an equal interval on a same circle, respectively in a state where the respective balls 10 can roll. Accordingly, the balls 10 respectively roll at constant positions relative to the casing 4 to which the static ring 11 is fixed. In this case, the static ring 11 functions as an annular ball retainer for holding a part of each ball 10 in a state where each ball 10 can roll.

On the other hand, the rotary ring 12 has the sliding surface 9 having the recesses and projections. The shape of the recesses and projections of the sliding surface 9 is made to have level differences 9A at an equal interval while changing smoothly from each level difference 9A toward the adjacent level difference 9A so that the balls 10 may fall down from the level differences 9A simultaneously during the normal rotation of the drill chuck 2 while the balls 10 may ascend no level differences during the normal rotation of the drill chuck 2. That is, the shape of the recesses and projections of the sliding surface 9 is determined so that the balls 10 simultaneously fall down from the level differences 9A of the sliding surface 9, and subsequently roll on the smoothly sloping surfaces up to the following level differences 9A respectively since there are no level differences which the balls 10 have to ascend, as exemplified by FIG. 5 and FIG. 6, as long as the drill T and the drill chuck 2 are normally rotated by the normal rotation of the motor 3.

In this case, the balls 10 simultaneously fall down from the level differences 9A of the sliding surface 9 respectively due to the drilling reaction from the workpiece W in the midst of drilling by the normal rotation of the drill T and the drill chuck 2 since the rotary ring 12, having the sliding surface 9, fixed to the drill chuck 2 rotates relatively to the balls 10. As a result, the drill T and the drill chuck 2 are momentarily and temporarily distanced from the workpiece W to approach the casing 4. Thereby, the drilling is interrupted, and a chip can be divided.

On the contrary, after the balls 10 have fallen down from the higher positions of the level differences 9A to the lower positions respectively, the balls 10 roll on the sliding surface 9, of which position changes smoothly, up to the higher positions of the adjacent level differences 9A respectively while contacting with the sliding surface 9 since the drill T and the drill chuck 2 are fed, and thereby receive the drilling reaction from the workpiece W again. Consequently, the drill T and the drill chuck 2 do not collide with the workpiece W at a high speed, and therefore the drilling reaction from the workpiece W does not increase locally. As a result, a user can continue drilling stably without being pushed back by the drilling reaction from the workpiece W while avoiding breakage of the drill T.

The sliding surface 9 can be formed as the inner surface of a groove 9B whose length direction is the rotation direction including the normal rotation direction and the reverse rotation direction of the drill chuck 2, as illustrated. In that case, the groove 9B has such slopes that the depth of the groove 9B shallows gradually from the respective level differences 9A, formed on the inner surface of the groove 9B, toward the adjacent level differences 9A.

Generally, the normal rotation is the clockwise rotation, and therefore the groove 9B of the rotary ring 12 rotates together with the drill chuck 2 clockwise relatively to the balls 10. Hence, the balls 10 rotate counterclockwise relatively to the groove 9B of the rotary ring 12. For this reason, each level difference 9A is formed in the groove 9B in the direction where the balls 10 fall down when the balls 10 rotate counterclockwise relatively to the annular groove 9B, as exemplified by FIG. 4 to FIG. 6. In other words, the groove 9B has the level differences 9A, from which the balls 10 fall down over the ridgelines when the balls 10 rotate counterclockwise relatively to the annular groove 9B, i.e., the balls 10 move rightward relatively to the groove 9B in the developed views shown in FIG. 5 and FIG. 6, and no level differences whose ridgelines are targets which the balls 10 have to ascend. Note that, in case of special drilling by rotating the drill T counterclockwise, what is necessary is to reverse the direction of the level differences 9A and the slopes.

Note that, the sliding surface 9 may be a tapered or corrugated surface having the level differences 9A in the same direction in the rotating direction of the drill chuck 2, instead of the inner surface of the groove 9B.

When the groove 9B is formed for the sliding surface 9, the groove 9B may be a V-groove whose cross section is V-shaped, a groove whose bottom surface is flat, or the like. When the shape of at least a part of the cross section of the groove 9B is made to an arc having the same radius as that of each ball 10 so that the balls 10 may fit to a part of the bottom of the groove 9B as illustrated, progress of wear of the balls 10 can be delayed since the balls 10 do not come into point contact with the groove 9B but come into line contact with the groove 9B. When the shape of the cross section of the groove 9B is made to an arc, the groove 9B is formed by groove machining using a ball end mill in many cases. For this reason, the valley side of each level difference 9A may be rounded.

Although the bottom of the groove 9B is wholly sloped between the level differences 9A adjacent to each other in the example shown in FIG. 5 and FIG. 6, ranges in which the bottom is sloped may be limited to parts beginning at the valley sides of the level differences 9A while the remaining portions toward the mountain sides of the adjacent level differences 9A may not have sloped bottoms respectively as long as edges of level differences which the balls 10 must ascend disappear.

Figure 7:
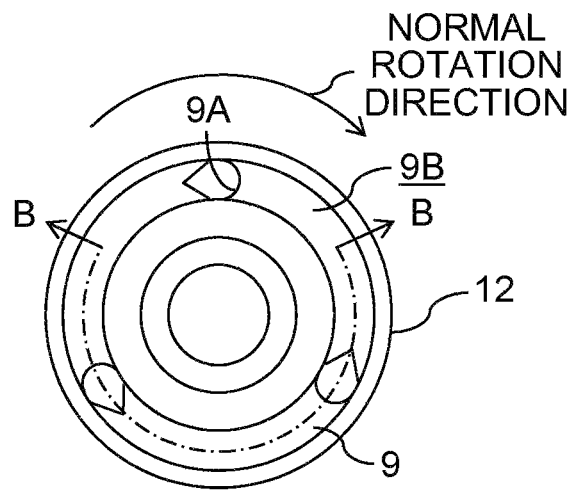
FIG. 7 is a right side view of another example of the rotary ring shown in FIG. 2 in a case where ranges in which the bottom face of the groove formed on the rotary ring slopes have been limited to the vicinities of the valley side portions of the level differences respectively.
Figure 8:
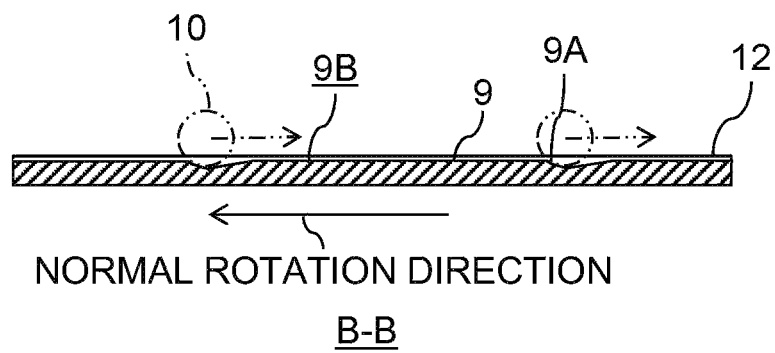
FIG. 8 shows the cross section, developed on a plane, of the rotary ring at the position B-B shown in FIG. 7.
Figure 9:
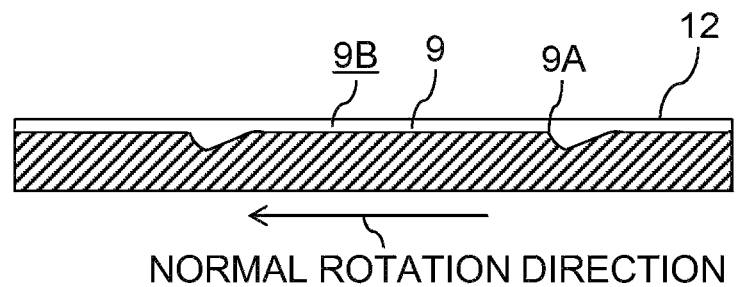
FIG. 9 shows the recesses and projections of the rotary ring emphasized by enlarging the developed cross sectional view of the rotary ring shown in FIG. 8 only in the thickness direction of the rotary ring.

FIG. 7 is a right side view of another example of the rotary ring 12 shown in FIG. 2 in a case where ranges in which the bottom face of the groove 9B formed on the rotary ring 12 slopes have been limited to the vicinities of the valley side portions of the level differences 9A respectively. FIG. 8 shows the cross section, developed on a plane, of the rotary ring 12 at the position B-B shown in FIG. 7. FIG. 9 shows the recesses and projections of the rotary ring 12 emphasized by enlarging the developed cross sectional view of the rotary ring 12 shown in FIG. 8 only in the thickness direction of the rotary ring 12.

As exemplified by FIG. 7 to FIG. 9, the ranges in which the bottom of the groove 9B is sloped may be limited to the vicinities of the valley side portions of the level differences 9A as long as the edges of the level differences which the balls 10 ascend are not generated. In this case, the shape of the rotary ring 12 can be simplified since the bottom of the groove 9B is not oblique on the mountain sides of the level differences 9A. Therefore, production of the rotary ring 12 can be also simplified. In particular, the smaller the height of each level difference 9A becomes, the shorter each range in which the bottom of the groove 9B is sloped can be made in order to remove an edge of a level difference, which the balls 10 must ascend, to a negligible degree.

The above-mentioned sliding surface 9 formed by the inner surface of the sloped groove 9B or the like has the level differences 9A at an equal interval, and therefore normally rotating the drill T and the drill chuck 2 at a predetermined rotating speed causes periodic vibration of the drill T and the drill chuck 2 at amplitude equivalent to the height of the level differences 9A. That is, once the balls 10 ascend the ridgelines of the level differences 9A, the moving direction of the drill T and the drill chuck 2 is reversed, and thereby drilling is interrupted.

Therefore, the height of the level differences 9A from which the balls 10 fall down can be determined so that a user can hold the tool driving device 1 by hand while the vibration has desired amplitude from a viewpoint of achieving the diving effect of chip, concretely to not less than 0.01 mm and not more than 0.15 mm as described above. Note that, the size of the balls 10 is not important, but the moving distance of the balls 10 in the tool axis AX direction, i.e., the height of the level differences 9A is important. Nevertheless, decreasing the size of the balls 10 leads to a merit that the vibrating mechanism 8 can be downsized, and conversely, increasing the size of the balls 10 leads to a merit that progress of wear of the balls 10 can be delayed.

The number of the balls 10 should be three or more from a viewpoint of preventing deflection amount of the drill T and the drill chuck 2 from increasing even when the drilling reaction is applied from the workpiece W. When the number of the balls 10 is increased, the number of the level differences 9A also increases according to the number of the balls 10, and therefore the interval between the level differences 9A adjacent to each other becomes short. Hence, when the number of the balls 10 is increased, the frequency of the drill T and the drill chuck 2 increases.

When the frequency of the drill T and the drill chuck 2 increases, a merit that chips can be made finer can be achieved while the cutting period per unit time becomes short since the interrupt frequency of drilling increases. Accordingly, it is desirable to confine the number of the balls 10 to one required in order to make a chip fine to a degree that chip clogging of the drill T can be fully avoided, from a viewpoint of preventing the cutting time from increasing. Note that, it is considered that the sufficient number of the balls 10 is three as long as a typical metal material, such as aluminum, is drilled under typical drilling conditions, such as a hole size, a hole depth, a rotating speed of the drill T, and the number of the cutting edges of the drill T.

It is also possible to vibrate the drill T and the drill chuck 2 at a predetermined frequency when the number of the level differences 9A formed on the sliding surface 9 is different from that of the balls 10 but equal to a multiple of the number of the balls 10. Nevertheless, it is appropriate to confine the number of the level differences 9A to one necessary for achieving the dividing effect of chip since the more the number of the level differences 9A is increased, the shorter the cutting period per unit time becomes, similarly to a case of increasing the number of the balls 10.

These conditions with regard to the balls 10 and the shape of the sliding surface 9 are the same in a case where the sliding surface 9 is not formed on the rotary ring 12 fixed to the drill chuck 2 but is formed on the static ring 11 fixed to the casing 4. When the sliding surface 9 is formed on the static ring 11 fixed to the casing 4, spherical concavities can be formed on the rotary ring 12 fixed to the drill chuck 2 so that the rotary ring 12 serves as a ball retainer. In that case, the balls 10 roll at constant positions relatively to the drill chuck 2 to which the rotary ring 12 is fixed. Therefore, when the drill T and the drill chuck 2 are normally rotated, the balls 10 also normally rotate while rolling on the sliding surface 9.

The above-mentioned tool driving device 1 generates periodic vibration, which distances the drill T and the drill chuck 2 from the workpiece W instantaneously and brings the drill T and the drill chuck 2 close to the workpiece W side slowly, using the vibrating mechanism 8 consisting of, e.g., the sliding surface 9, having appropriate concavities and convexities, and the balls 10 rolling on the sliding surface 9.

(Effect)

According to the tool driving device 1, chips can be divided finely and thereby discharged easily since the drill T is pulled apart from the workpiece W intermittently and periodically. Accordingly, deterioration in quality of a hole, such as excess in diameter of a hole in an FRP, caused by chip clogging in a groove of the drill T can be prevented. Therefore, when the drill T is held by the tool driving device 1 and the workpiece W is drilled by the drill T rotated by the tool driving device 1, a drilled product having a hole with high quality can be produced. For example, even when the workpiece W consisting of laminated FRP and metal, such as laminated CFRP and aluminum or titanium, is drilled as exemplified by FIG. 1, a drilled product having a hole with high quality can be produced since metal chips are divided and thereby do not clog any groove of the drill T.

In addition, trouble that the drill T is damaged due to collision of the drill T with the workpiece W and trouble that the tool driving device 1 held by hand of a user is pushed back by the drilling reaction can be avoided since the speed of the drill T is small at the time of approaching the workpiece W and change of the drilling reaction is also small in case of adopting the vibrating mechanism 8 of the tool driving device 1 while the conventional vibrating mechanism which vibrates a drill by rolling balls causes precipitous change of the vibrating direction when the balls come out from concave portions as well as when the balls go into the concave portions, and thereby trouble that the drill collides with a workpiece or trouble that a user is pushed back due to instantaneously increased drilling reaction sometimes arises.

In addition, in case of the vibrating mechanism 8 of the tool driving device 1, wear of the balls 10 due to repeated collision of the balls 10 with edges of level differences can be avoided since there are no level differences, which the balls 10 ascend, on the sliding surface 9 although the conventional vibrating mechanism, which makes balls go into and come out from concave portions, causes a problem that the balls and the edges of the concave portions are worn away since the balls repeatedly contact with the edges of the concave portions when the balls come out from the concave portions.

(Second Implementation)

Figure 10:
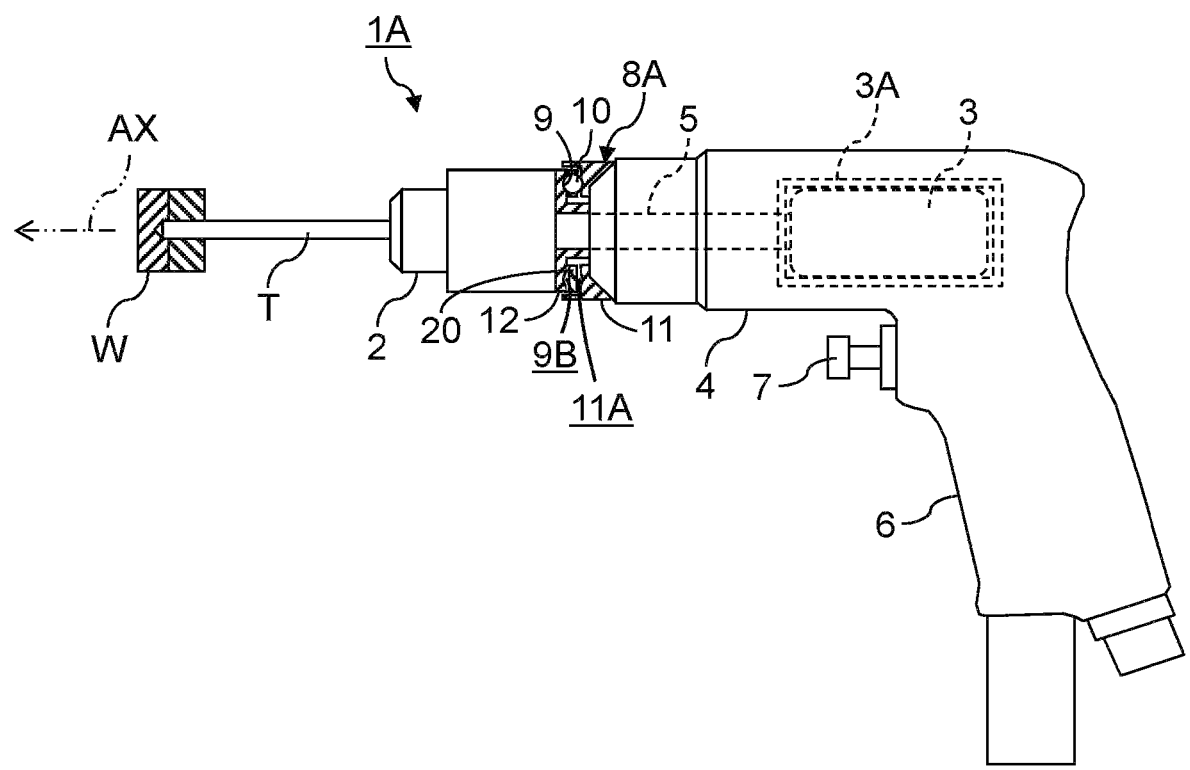
FIG. 10 is a partial sectional view showing structure of a tool driving device according to the second implementation of the present invention.

FIG. 10 is a partial sectional view showing structure of a tool driving device according to the second implementation of the present invention.

A tool driving device 1A in the second implementation shown in FIG. 10 is different from the tool driving device 1 in the first implementation in structure that a vibrating mechanism 8A has the balls 10 rolling while rotating relatively to both the drill chuck 2 and the casing 4. Other structure and actions of the tool driving device 1A in the second implementation are not substantially different from those of the tool driving device 1 in the first implementation. Therefore, the same signs are attached to the same elements and the corresponding elements while explanation thereof is omitted.

In case of rotating the balls 10 without fixing the positions of the balls 10 relatively to both the drill chuck 2 and the casing 4, what is necessary is to dispose an annular ball retainer 20, for holding parts of the balls 10 in a state where the balls 10 can roll, rotatably in the rotating direction of the drill chuck 2 including the normal rotation direction and the inverse rotation direction, i.e., around the tool axis AX, without fixing the ball retainer 20 to any of the drill chuck 2 and the casing 4. For example, the ball retainer 20 can be rotatably disposed in a space formed between the static ring 11 fixed to the casing 4 and the rotary ring 12 fixed to the drill chuck 2, as exemplified by FIG. 10.

Figure 11:
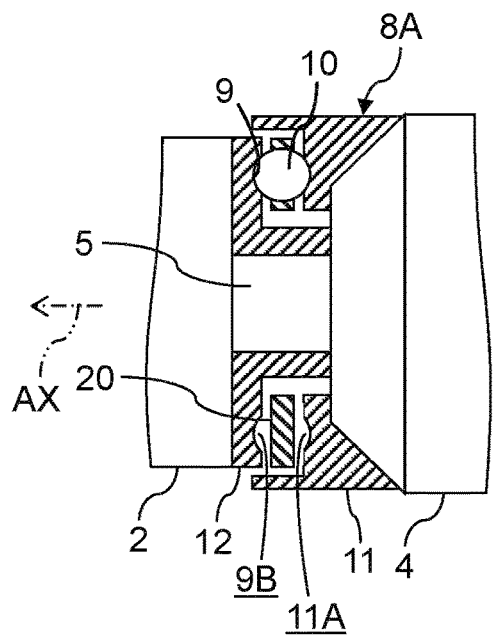
FIG. 11 is an enlarged partial longitudinal sectional view of the vibrating mechanism shown in FIG. 10.
Figure 12:
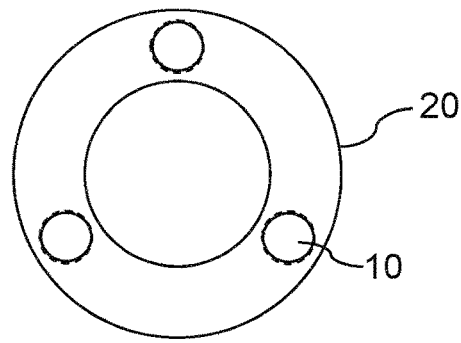
FIG. 12 is a left side view of the ball retainer shown in FIG. 11 in a state where the balls have been held by the ball retainer.
Figure 13:
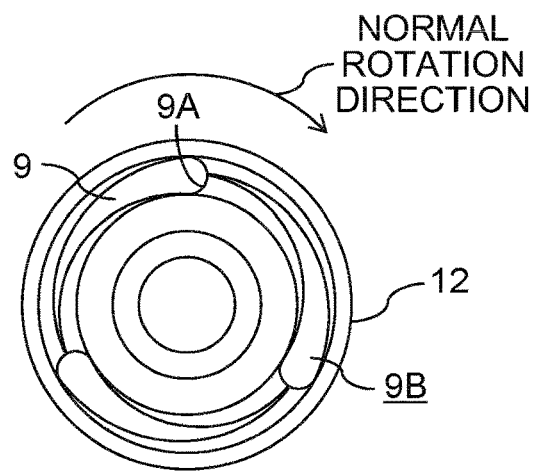
FIG. 13 is a right side view of the rotary ring shown in FIG. 11.

FIG. 11 is an enlarged partial longitudinal sectional view of the vibrating mechanism 8A shown in FIG. 10. FIG. 12 is a left side view of the ball retainer 20 shown in FIG. 11 in a state where the balls 10 have been held by the ball retainer 20. FIG. 13 is a right side view of the rotary ring 12 shown in FIG. 11.

As exemplified by FIG. 11 and FIG. 12, the balls 10 and the ball retainer 20, consisting of an annular plate having through holes whose number is same as that of the balls 10, can be disposed between the static ring 11 and the rotary ring 12 in a state where the balls 10 are held by the ball retainer 20. Note that, in the example shown in FIG. 11 and FIG. 12, the ball retainer 20 can be housed between the static ring 11 and the rotary ring 12 since the static ring 11 has a cylindrical edge whose inner diameter is larger than the outer diameter of the rotary ring 12.

As exemplified by FIG. 13, the rotary ring 12 has the sliding surface 9, having the level differences 9A, formed as the inner surface of the sloped groove 9B or the like, similar to that in the first implementation. As a matter of course, when the sloped groove 9B is formed on the rotary ring 12, the bottom of the groove 9B may be locally or partially sloped as exemplified by FIG. 7 to FIG. 9

When the ball retainer 20 can be rotated relatively to both of the static ring 11 and the rotary ring 12 as illustrated, the drilling reaction acts not only on the balls 10 from the rotary ring 12, but on the static ring 11 from the balls 10. Therefore, the balls 10 are rotated while rolling relatively to both the static ring 11 and the rotary ring 12 due to the frictional force between the balls 10 and the static ring 11, and the frictional force between the balls 10 and the rotary ring 12. That is, the balls 10 roll while rotating relatively to the drill chuck 2 and the casing 4.

For this reason, a groove 11A, having a constant depth, for rolling the balls 10 may be also formed on the static ring 11. In this case, making the shape of the cross section of the groove 11A such an arc that the inner surface of the groove 11A may fit with the balls 10 allows decreasing the progression rate of wear of the balls 10 since the balls 10 roll while coming into line contact with the inner surface of the groove 11A. As a matter of course, the sliding surface 9 having the level differences 9A, formed as the inner surface of the sloped groove 9B or the like may be formed on the static ring 11 side.

According to the above-mentioned second implementation, effect that the frictional force between the balls 10, and the static ring 11 and the rotary ring 12 can be reduced remarkably can be attained in addition to effect similar to that in the first implementation. Specifically, in a case where the balls 10 are held by a ball retainer consisting of the static ring 11 having spherical concavities like the first implementation, the balls 10 necessarily roll while sliding relatively to either the static ring 11 or the rotary ring 12. Accordingly, when the rotation speed of the drill T and the drill chuck 2 is large, the frictional force between the balls 10, and the static ring 11 and the rotary ring 12 also becomes large, and thereby the balls 10 may be worn out in a short time.

In particular, when drilling is performed with the drill T having a small tool diameter of about 3 mm to 10 mm, the rotation speed of the drill T becomes 2000 rpm to 6000 rpm in many cases. As a result of actual examinations using prototypes under the corresponding drilling conditions, it has been confirmed that the balls 10 were occasionally heated up to not less than 100° C. and worn out due to friction, and thereby the diameter of each ball 10 decreased. Therefore, when drilling is performed using the drill T having a small diameter, it is desirable to adopt the second implementation, which allows reducing the frictional force between the balls 10, and the static ring 11 and the rotary ring 12 to a negligible extent, from a viewpoint of securing a tool life.

(Third Implementation)

Figure 14:
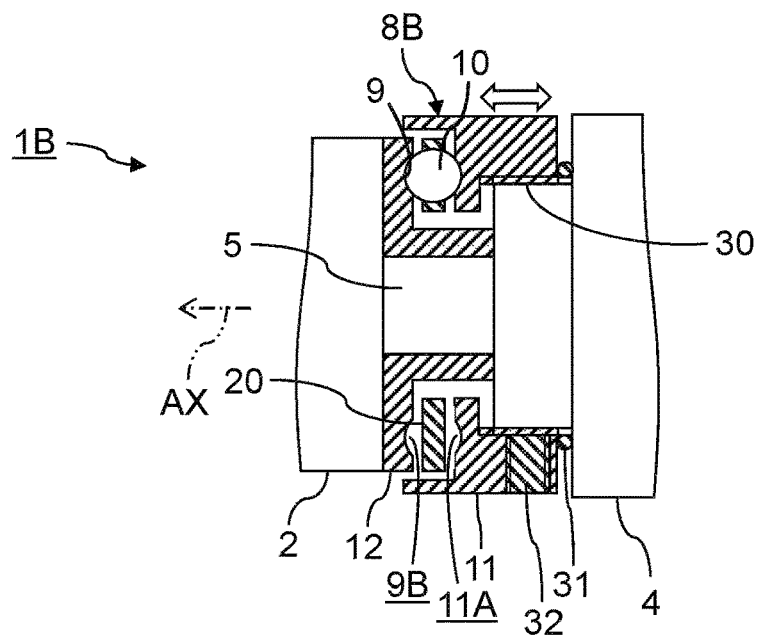
FIG. 14 is a longitudinal sectional view showing structure of a vibrating mechanism included in a tool driving device according to the third implementation of the present invention.

FIG. 14 is a longitudinal sectional view showing structure of a vibrating mechanism included in a tool driving device according to the third implementation of the present invention.

A tool driving device 1B in the third implementation shown in FIG. 14 is different from each of the tool driving device 1 in the first implementation and the tool driving device 1A in the second implementation in a point that a vibrating mechanism 8B has a function to adjust the amplitude of the vibration generated in the drill T and the drill chuck 2, and a function to switch the vibration off. Other structure and actions of the tool driving device 1B in the third implementation are not substantially different from those of each of the tool driving device 1 in the first implementation and the tool driving device 1A in the second implementation. Therefore, only the vibrating mechanism 8B is illustrated, and the same signs are attached to the same elements and the corresponding elements while explanation thereof is omitted.

The vibrating mechanism 8B in the third implementation is configured so that the amplitude of the vibration in the tool axis AX direction generated in the drill T and the drill chuck 2, i.e., the amplitude of the reciprocation of the drill T and the drill chuck 2 in the tool axis AX direction can be adjusted with an amplitude adjusting thread 30.

In this case, when the length of the amplitude adjusting thread 30 is determined so that the amplitude of the drill T and the drill chuck 2 in the tool axis AX direction can be adjusted to zero, the amplitude of the reciprocation of the drill T and the drill chuck 2 can be switched between an on-state and the off-state. That is, a vibration mode in which the drill T and the drill chuck 2 are reciprocated in the tool axis AX direction can be switched to the non-vibration mode in which the drill T and the drill chuck 2 are not reciprocated in the tool axis AX direction.

FIG. 14 shows an example of the vibrating mechanism 8B composed of the balls 10, the static ring 11, the rotary ring 12 and the ball retainer 20. Similarly to the second implementation, the ball retainer 20 holding the balls 10 is rotatably disposed between the static ring 11 fixed to the casing 4 and the rotary ring 12 fixed to the drill chuck 2. Accordingly, the amplitude of the vibration of the drill T and the drill chuck 2 can be adjusted by adjusting the interval between the static ring 11 and the rotary ring 12 by the amplitude adjusting thread 30.

Figure 15:
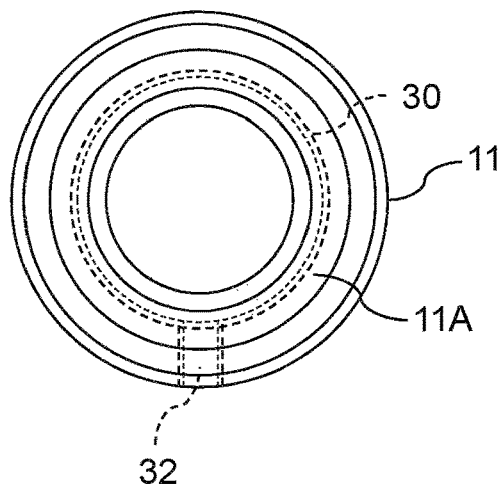
FIG. 15 is a left side view of the static ring shown in FIG. 14.
Figure 16:
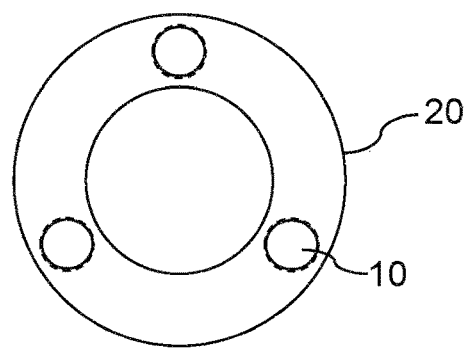
FIG. 16 is a left side view of the ball retainer shown in FIG. 14 in a state where the balls have been held by the ball retainer.
Figure 17:
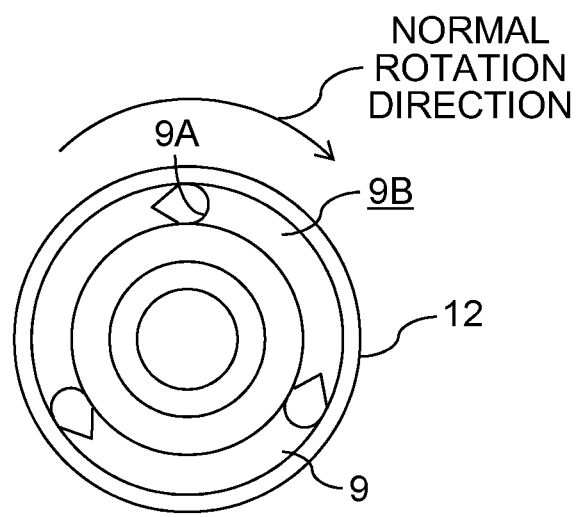
FIG. 17 is a right side view of the rotary ring shown in FIG. 14.

FIG. 15 is a left side view of the static ring 11 shown in FIG. 14. FIG. 16 is a left side view of the ball retainer 20 shown in FIG. 14 in a state where the balls 10 have been held by the ball retainer 20. FIG. 17 is a right side view of the rotary ring 12 shown in FIG. 14.

Similarly to the second implementation, the ball retainer 20 holding the balls 10 as shown in FIG. 14 and FIG. 16 can be rotatably disposed between the static ring 11 fixed to the casing 4 and the rotary ring 12 fixed to the drill chuck 2. In this case, a groove 11A whose depth is constant can be formed on the static ring 11 as shown in FIG. 14 and FIG. 15 while a groove 9B having a sliding surface 9 consisting of slops and level differences 9A of 0.01 mm to 0.15 mm can be formed on the rotary ring 12 as shown in FIG. 14 and FIG. 17. As a matter of course, the depth of the groove 9B on the rotary ring 12 may be decreased gradually between the level differences 9A as shown in FIG. 13. Meanwhile, the groove 11A on the static ring 11 may be omitted.

The space formed between the groove 11A of the static ring 11 and the groove 9B of the rotary ring 12 can be used as the pathway for moving the balls 10 relatively to the static ring 11 and the rotary ring 12. In this case, when the rotary ring 12 rotates relatively to the casing 4 and the static ring 11 together with the drill chuck 2 and the spindle 5, the balls 10 pass through the level differences 9A on the rotary ring 12 which receives the drilling reaction force from the workpiece W together with the drill T and the drill chuck 2, and thereby, the drill T and the drill chuck 2 can be vibrated in the tool axis AX direction.

The more the interval between the static ring 11 and the rotary ring 12 is widened, the more the moving distance of the rotary ring 12 in the tool axis AX direction decreases gradually even when the balls 10 passes through the level differences 9A on the rotary ring 12. That is, when the interval between the static ring 11 and the rotary ring 12 is widened, the amplitude of the vibration of the drill T and the drill chuck 2 decreases. When the interval between the static ring 11 and the rotary ring 12 reaches a certain distance, the amplitude becomes zero and the vibration stops.

This is because the balls 10 pass through the interspace formed between the groove 11A of the static ring 11 and the groove 9B of the rotary ring 12 without resistance to the drilling reaction force in principle in a case where the drilling reaction force is applied from the workpiece W to the rotary ring 12 fixed to the drill chuck 2 as long as the interspace formed between the groove 11A of the static ring 11 and the groove 9B of the rotary ring 12 has a size corresponding to the diameter of the balls 10.

Accordingly, as shown in FIG. 14 and FIG. 15, the static ring 11 can be configured to be slidable relatively to the casing 4 in the tool axis AX direction by coupling the static ring 11 to the casing 4 with the amplitude adjusting thread 30. In this case, since the rotary ring 12 is fixed to the drill chuck 2, the interval between the static ring 11 and the rotary ring 12 can be finely adjusted by sliding the static ring 11 in the tool axis AX direction.

Although FIG. 14 shows an example of case where an internal thread is formed on the inner surface of the portion, having cylindrical structure, of the static ring 11 while an external thread is formed on the outer surface of the portion, having cylindrical structure, of the casing 4, the internal thread may be reversed with the external thread. That is, the static ring 11 may be inserted into the inside of the casing 4 instead of inserting the distal portion of the casing 4 into the inside of the static ring 11.

In order to make it possible to slide the static ring 11 relatively to the casing 4 in the tool axis AX direction, it is necessary to space the static ring 11 from the casing 4 with an interval varying slightly. Accordingly, an elastic O ring 31 made of rubber or the like may be disposed between the static ring 11 and the casing 4. Thereby, the static ring 11 can be supported with the O ring 31 in the tool axis AX direction since the O ring 31 is crushed by the moving distance of the static ring 11 even when the static ring 11 is moved in the tool axis AX direction within a range of the 0.01 mm order to the 0.1 mm order.

As shown in FIG. 14 and FIG. 15, an internal thread whose depth direction is the radial direction of the static ring 11 can be formed in the static ring 11 so that a fixing screw 32 can be fastened. Thereby, the static ring 11 can be prevented from rotating relatively to the casing 4 by fastening the fixing screw 32 so that the casing 4 may be pressed with the tip of the fixing screw 32. That is, the fixing screw 32 can be attached as a stopper for preventing the static ring 11 from rotating to the casing 4 and sliding in the tool axis AX direction.

The fixing screw 32 may be not only a slotted screw, fastened with a slotted screwdriver, but a hand screw, such as a wing bolt or a knurled screw. Although the O ring 31 may be omitted since the static ring 11 can be prevented from sliding in the tool axis AX direction using the fixing screw 32, supporting the static ring 11 with both of the fixing screw 32, which applies pressure in the radial direction on the static ring 11, and the O ring 31, which can support the static ring 11 in the tool axis AX direction, leads to the stabilization of the static ring 11.

When the position of the static ring 11 in the tool axis AX direction is finely adjusted as a fastening amount of the amplitude adjusting thread 30, the amplitude of the reciprocation of the drill T and the drill chuck 2 in the tool axis AX direction can be adjusted continuously and steplessly. When the amplitude of the reciprocation of the drill T and the drill chuck 2 in the tool axis AX direction is adjustable to zero by sufficiently securing the stroke of the amplitude adjusting thread 30, the drill T and the drill chuck 2 can be rotated in the state that the reciprocation of the drill T and the drill chuck 2 is stopped.

Accordingly, the amplitude of the vibration of the drill T and the drill chuck 2 can be adjusted according to drilling conditions including the size of the drill T, the material of the workpiece W, and the rotating speed of the drill T so that chips may be divided to have appropriate sizes. As mentioned above, the amplitude of the vibration of the drill T and the drill chuck 2 changes according to the sliding amount of the static ring 11 in the tool axis AX direction. The sliding amount of the static ring 11 in the tool axis AX direction changes according to the rotating amount of the static ring 11 to the casing 4, which is equivalent to the fastening amount of the amplitude adjusting thread 30. Accordingly, scale marks for checking the rotating amount of the static ring 11 may be presented so that a user can finely adjust the amplitude of the vibration of the drill T and the drill chuck 2 manually and easily.

Figure 18:
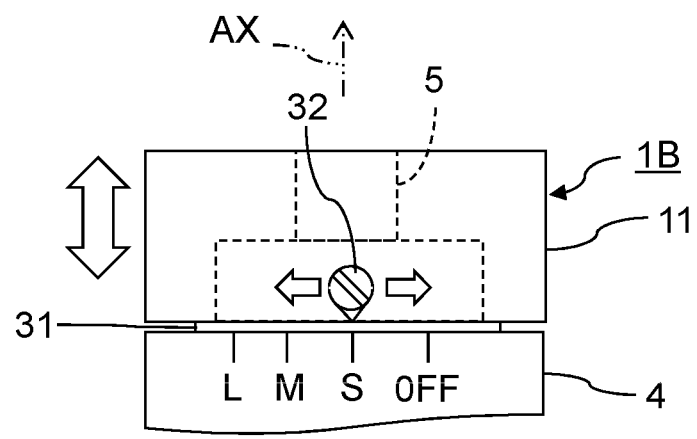
FIG. 18 shows an example of scale marks representing degrees of the amplitude of the vibration of the drill and the drill chuck, generated by the vibrating mechanism shown in FIG. 14.

FIG. 18 shows an example of scale marks representing degrees of the amplitude of the vibration of the drill T and the drill chuck 2, generated by the vibrating mechanism 8B shown in FIG. 14.

For example, as shown in FIG. 18, the position of the fixing screw 32 can be set to a reference position while scale marks can be presented on the casing 4. In the example shown in FIG. 18, indications of the amplitude of the vibration consist of three levels of L (large), M (middle) and S (small), and the matching position for switching the vibration off is also presented.

Accordingly, a user can finely adjust the amplitude of the vibration according to drilling conditions easily by reference to the scale marks. Specifically, a user can fix the position of the static ring 11 in the tool axis AX direction by rotating the static ring 11 by reference to the scale marks and fastening the fixing screw 32 at a desired rotation position.

As described above, the vibrating mechanism 8B in the third implementation has an amplitude adjustment mechanism, i.e., an amplitude adjuster consisting of the amplitude adjusting thread 30 for adjustable setting of the amplitude of the vibration of the drill T and the drill chuck 2 so that the amplitude of the vibration of the drill T and the drill chuck 2 can be adjusted according to drilling conditions.

(Effect)

According to the third implementation, the amplitude of the vibration generated in the drill T and the drill chuck 2 can be adjusted according to drilling conditions including the tool diameter of the drill T to be used, the material of the workpiece W, and the rotating speed of the drill T so that chips may have appropriate sizes. As a result, the drilling quality can be improved and drilling can be stabilized by preventing chip clogging As a practical example, in case of rotating the drill T, having a small diameter, at a high speed, the amplitude can be set small so as to decrease interruption times of cutting due to the vibration since the cutting amount is small. Conversely, in case of rotating the drill T, having a large diameter, at a low speed, the amplitude can be set large so as to divide chips certainly since the cutting amount is large.

As another example, in case of drilling a laminated material of a metal and an FRP from the metal side, dividing metal chips can avoid a trouble that a hole in resin becomes too large. Conversely, in case of drilling the workpiece W made of a single material, it may be desirable to generate no vibration from a viewpoint of shortening a cutting time. That is, in a case where any continuous chip is not discharged ever as well as a case where an undivided chip does not cause a problem in drilling quality, vibrating the drill T and the drill chuck 2 causes interruptions of cutting which lengthen a cutting time.

In such a case, the vibration of the drill T and the drill chuck 2 can be switched off so that the increase in a cutting time can be avoided. That is, not only an adjustment of the amplitude of the vibration but switching between an on state and the off state can be performed so that the balance between a drilling quality and a cutting time may become optimum.

Note that, the amplitude of the vibration of the drill T and the drill chuck 2 can be changed also in each of the first and second implementations by exchanging the rotary ring 12 for another rotary ring 12 having a groove 9B whose depth is different, or exchanging the static ring 11 for another static ring 11 having a groove 11A whose depth is different.

On the other hand, in case of the third implementation, it is unnecessary to exchange any part of the vibrating mechanism 8B. Therefore, working hours of a user can be reduced. In addition, it also becomes unnecessary to produce two or more parts. Moreover, in case of the third implementation, the amplitude of the vibration can be changed continuously. Therefore, changing drilling conditions according to the amplitude of the vibration, such as changing the thrust force at the time of the drilling, becomes unnecessary. That is, the amplitude of the vibration can be adjusted according to drilling conditions instead of determining drilling conditions according to settable amplitude of the vibration.

(First Modification of Third Implementation)

Figure 19:
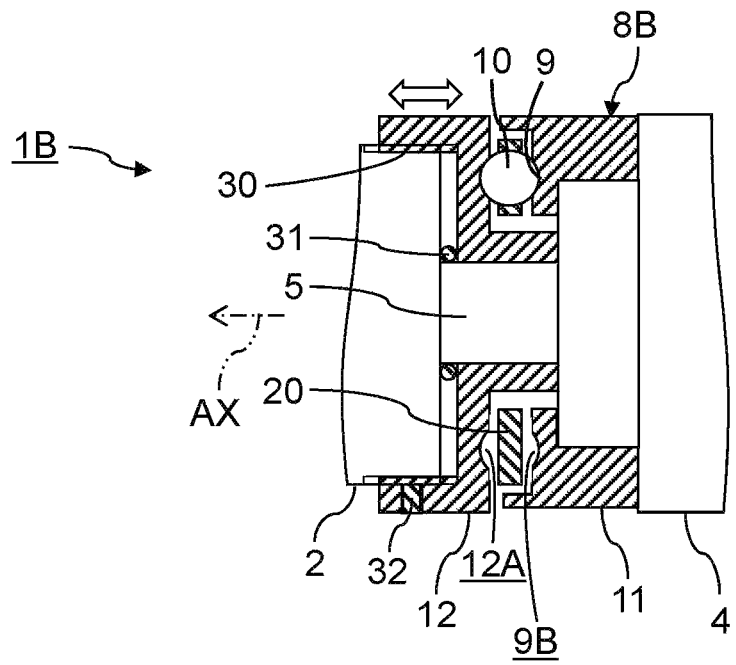
FIG. 19 is a longitudinal sectional view showing structure of the first modification of a vibrating mechanism included in a tool driving device according to the third implementation of the present invention.

FIG. 19 is a longitudinal sectional view showing structure of the first modification of a vibrating mechanism included in a tool driving device according to the third implementation of the present invention.

As shown in FIG. 19, the groove 9B having the slopes and the level differences 9A may be formed on the static ring 11 instead of the rotary ring 12, as described also in each of the first and second implementations. In that case, forming a groove 12A, having a constant depth, on the rotary ring 12 allows delaying the progress of wear of each ball 10 since each ball 10 is brought into line contact with the rotary ring 12.

The amplitude adjusting thread 30 may be formed on the rotary ring 12 as shown in FIG. 19 although the amplitude adjusting thread 30 may be formed on the static ring 11 as shown in FIG. 14. That is, the amplitude adjusting thread 30 can be formed on at least one of the static ring 11 and the rotary ring 12.

In the example shown in FIG. 19, the internal thread of the amplitude adjusting thread 30 is formed on the inner surface of a cylindrical portion formed on the drill chuck 2 side of the rotary ring 12. Meanwhile, the external thread of the amplitude adjusting thread 30 is formed on the outer surface of the drill chuck 2. Therefore, the rotary ring 12 can be slid in the tool axis AX direction relatively to the drill chuck 2 by adjusting the fastening amount of the amplitude adjusting thread 30. As a result, the interval of the static ring 11 and the rotary ring 12 can be changed.

In case of moving the rotary ring 12 relatively to the drill chuck 2, it is necessary to change the interspace between the rotary ring 12 and the drill chuck 2. Accordingly, an O ring 31 can be disposed between the rotary ring 12 and the drill chuck 2. In addition, the rotary ring 12 can be fixed to the drill chuck 2 with a fixing screw 32.

Note that, the amplitude adjusting thread 30 may be formed between the spindle 5 and the rotary ring 12. Specifically, the external thread may be formed on the outer surface of the spindle 5 while the internal thread may be formed on the inner surface of the rotary ring 12. Also in that case, the rotary ring 12 can be fixed to the drill chuck 2 with a fixing screw 32 from the outside as long as a cylindrical portion is formed on the drill chuck 2 side of a rotary ring 12.

(Second Modification of Third Implementation)

Figure 20:
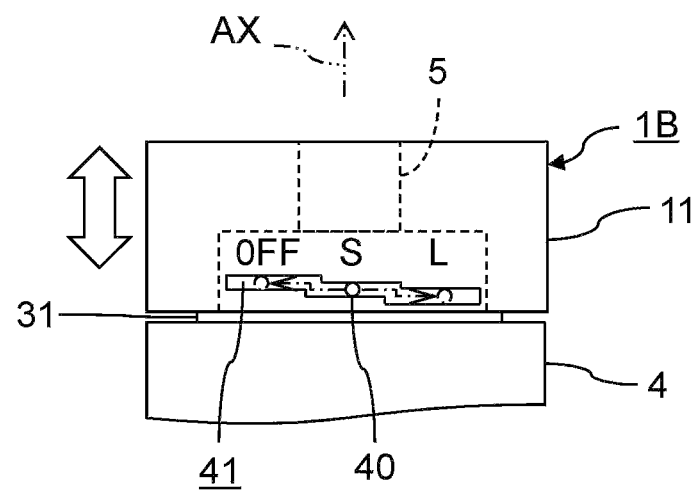
FIG. 20 is a front view showing structure of the second modification of a vibrating mechanism included in a tool driving device according to the third implementation of the present invention.

FIG. 20 is a front view showing structure of the second modification of a vibrating mechanism included in a tool driving device according to the third implementation of the present invention.

The amplitude adjustment mechanism for adjusting the amplitude of the vibration of the drill T and the drill chuck 2 by changing the interval between the static ring 11 and the rotary ring 12 can also be formed using a key 40 and a key groove 41 although a case where the vibrating mechanism 8B has the amplitude adjusting thread 30 as the amplitude adjustment mechanism has been described in the above-mentioned example.

As a concrete example, the columnar key 40 whose length direction is a radial direction of the static ring 11 can be projected from the distal portion of the casing 4 inserted into the cylindrical portion of the static ring 11 as shown in FIG. 20. On the other hand, the key groove 41 in which the key 40 can be slid in the length direction of the key groove 41 can be formed in the static ring 11.

The pathway of the key groove 41 can be determined so that the static ring 11 may slide in the tool axis AX direction when the key 40 is slid along the key groove 41 by rotating the static ring 11 relatively to the casing 4. In this case, the static ring 11 can be slid in the tool axis AX direction relatively to the casing 4 according to the rotating amount of the static ring 11.

In the example shown in FIG. 20, the static ring 11 has the stepwise key groove 41 derived by coupling the end portions of three parallel partial key grooves 41, of which length directions are the circumferential direction of the static ring 11, to each other. Therefore, when the static ring 11 is rotated, the static ring 11 can be slid in the tool axis AX direction in stages by a distance corresponding to a level difference in the key groove 41.

Accordingly, when the positions of the key groove 41 are determined according to possible intervals to be adjusted between the static ring 11 and the rotary ring 12, the interval between the static ring 11 and the rotary ring 12 can be set to a target interval out of the possible intervals. Since each level difference in the key groove 41 is equivalent to a sliding amount of the static ring 11, each level difference is in the 0.01 mm order to the 0.1 mm order.

In the example shown in FIG. 20, the static ring 11 has the key groove 41 consisting of the three partial key grooves 41. The first partial key groove 41 is for sliding the static ring 11 to a position where the interval between the static ring 11 and the rotary ring 12 becomes large sufficiently and thereby vibration becomes the off state. The second partial key groove 41 is for sliding the static ring 11 to a position where the interval between the static ring 11 and the rotary ring 12 becomes a middle degree and thereby vibration arises with small amplitude. The third partial key groove 41 is for sliding the static ring 11 to a position where the interval between the static ring 11 and the rotary ring 12 becomes the minimum and thereby vibration arises with large amplitude.

Note that, the key groove 41 whose length direction is spiral may be formed on the static ring 11, and the static ring 11 may be configured to be fixable to the casing 4 with a fixing screw 32. In that case, the static ring 11 can be continuously slid in the tool axis AX direction.

Alternatively, the key groove 41 may not be a through-slit but be a groove having the bottom face. Therefore, the key 40 may be projected from the inner surface of the static ring 11 toward the casing 4 while the key groove 41 may be formed on the casing 4. Nevertheless, forming the through key groove 41 in the static ring 11 allows checking the position of the key 40 from the outside.

The amplitude adjustment mechanism formed with the key 40 and the key groove 41 may also be disposed between the rotary ring 12 and the drill chuck 2. That is, the amplitude adjusting thread 30 shown in FIG. 19 may be replaced with the amplitude adjustment mechanism formed with the key 40 and the key groove 41.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A tool driving device comprising:
   a drill chuck for holding a drill;
   a motor configured to rotate the drill chuck;
   a casing housing the motor; and
   a vibrator configured to periodically reciprocate the drill chuck relatively to the casing in a tool axis direction during rotation of the drill chuck,
   wherein the vibrator is configured to distance the drill chuck from the casing at a first speed smaller than a second speed for bringing the drill chuck close to the casing,
   wherein the vibrator includes an amplitude adjuster configured to adjust amplitude of reciprocation of the drill chuck,
   wherein the amplitude adjuster allows adjusting the amplitude of the reciprocation to zero so that the drill chuck rotates without the reciprocation, and wherein the vibrator includes:
balls rollingly disposed between the drill chuck and the casing, the balls being disposed away from each other at regular intervals on a same circle; and
a sliding surface formed directly or indirectly on one of the drill chuck and the casing, the balls being contacted to the sliding surface while rolling during the rotation of the drill chuck,
wherein the sliding surface has equally spaced level differences at which the balls fall simultaneously during normal rotation of the drill chuck, and
the sliding surface changes smoothly from each level difference toward an adjacent level difference, no level differences at which the balls ascend during the normal rotation of the drill chuck being formed on the sliding surface by the smoothly changing sliding surface.

2. A method of producing a drilled product comprising:
holding the drill by the tool driving device according to claim 1; and
producing the drilled product by drilling an object by the drill rotated by the tool driving device.

3. The tool driving device according to claim 1, wherein, relative to the tool axis direction, the vibrator is positioned between the drill chuck and the motor and the motor shifts together with the drill chuck along the tool axis direction at the first and second speeds.

4. The tool driving device according to claim 1, wherein radially spaced end edging of the sliding surface converges as to define a V-groove.

5. The tool driving device according to claim 1, wherein at a maximum depth of a drop slope of the sliding surface there is a concave depression configured for reception of a respective one of the balls.

6. The tool driving device according to claim 1, wherein a return slope of the sliding surface rises to an upward end that is at a groove level in the sliding surface that is maintained at a constant level in extending circumferentially away from the upward end of the return slope until the next one of the equally spaced level differences.

7. The tool driving device according to claim 1, wherein after the balls fall simultaneously during normal rotation of the drill chuck into the equally spaced level differences the balls rise, while running along guidance edging of the sliding surface that converges circumferentially, in a direction away from the end of respective downward slopes of the sliding surface.

8. The tool driving device according to claim 7, wherein at a maximum depth of each of the downward slopes there is a concave depression configured for reception of a respective one of the balls.

9. The tool driving device according to claim 1, wherein the vibrator further includes a ball retainer holding the balls rollingly, the ball retainer being rotatable around a tool axis, the balls rolling while rotating relatively to the drill chuck and the casing.

10. The tool driving device according to claim 1, wherein the amplitude adjuster comprises a key and a key groove combination.

11. The tool driving device according to claim 9, wherein, relative to the tool axis direction, the vibrator is positioned between the chuck and the motor and the motor shifts together with the drill chuck along the tool axis direction at the first and second speeds.

* * * * *